US012080542B2

(12) United States Patent
Yoon et al.

(10) Patent No.: US 12,080,542 B2
(45) **Date of Patent: *Sep. 3, 2024**

(54) LIGHT IRRADIATION DEVICE

(71) Applicant: UNILAM CO., LTD., Ulsan (KR)

(72) Inventors: Joo Young Yoon, Busan (KR); Eun Sik Kim, Busan (KR); Hong Chae Jung, Gyeongsangnam-do (KR); Se Hwi Park, Busan (KR); So Ree Kim, Ulsan (KR)

(73) Assignee: UNILAM CO., LTD., Ulsan (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/743,677

(22) Filed: May 13, 2022

(65) Prior Publication Data

US 2022/0367171 A1 Nov. 17, 2022

(30) Foreign Application Priority Data

May 14, 2021 (KR) ........................ 10-2021-0062888

(51) Int. Cl.
*H01J 61/06* (2006.01)
*H01J 61/54* (2006.01)
*H01J 65/00* (2006.01)

(52) U.S. Cl.
CPC ............ *H01J 61/06* (2013.01); *H01J 61/547* (2013.01); *H01J 65/00* (2013.01)

(58) Field of Classification Search
CPC ........... H01J 61/06; H01J 61/547; H01J 65/00
USPC .......................................................... 315/246
See application file for complete search history.

(56) References Cited

U.S. PATENT DOCUMENTS 7,969,092 B1 * 6/2011 Wedding .................. H01J 11/18 313/582
8,035,303 B1 * 10/2011 Strbik, III ................ H01J 11/18 313/582
2004/0033319 A1 * 2/2004 Yamada ................ C23C 18/143 427/378
2013/0099679 A1 * 4/2013 Ikeda ...................... H01J 61/54 315/183
2017/0186596 A1 6/2017 Shinoda et al.
2018/0144925 A1 * 5/2018 Shinoda .................. H01J 61/92
(Continued)

FOREIGN PATENT DOCUMENTS

KR 10-2021-0052526 A 5/2021

OTHER PUBLICATIONS

Office action issued on Mar. 16, 2023 from Korean Patent Office in a counterpart Korean Patent Application No. 10-2021-0052526 (all the cited references are listed in this IDS.) (English translation is also submitted herewith.).

*Primary Examiner* — Christopher M Raabe
(74) *Attorney, Agent, or Firm* — The PL Law Group, PLLC

(57) ABSTRACT

A light irradiation device according to an embodiment includes an excimer lamp including a light emitting tube emitting light, a first electrode disposed at an outer side of the light emitting tube, a second electrode disposed at an outer side of the light emitting tube in correspondence to the first electrode, and an auxiliary light emitting body disposed between the first electrode and the second electrode to emit light toward the light emitting tube when a voltage is applied to the first and second electrodes, and a case in which the excimer is provided and which has a contact point adjustment part configured to accommodate a portion of the auxiliary light emitting body.

8 Claims, 6 Drawing Sheets

(56) References Cited

U.S. PATENT DOCUMENTS

| | | | | |
|---|---|---|---|---|
| 2020/0152442 | A1* | 5/2020 | Shinoda | H01J 65/04 |
| 2022/0367171 | A1* | 11/2022 | Yoon | H01J 65/046 |

* cited by examiner

LIGHT IRRADIATION DEVICE

CROSS-REFERENCE TO RELATED APPLICATIONS

This U.S. non-provisional patent application claims priority under 35 U.S.C. § 119 of Korean Patent Application No. 10-2021-0062888, filed on May 14, 2021, the entire contents of which are hereby incorporated by reference.

BACKGROUND

Embodiments of the present invention relates to a light irradiation device capable of improving start-up characteristics and a light irradiation efficiency of a lamp and being miniaturized as well as preventing a component damage and an optical defect due to an external factor.

In recent years, a light irradiation device using ultraviolet light is used in various fields such as industrial, environmental, medical, and sterilization fields. Among light sources used in the light irradiation device, an excimer lamp is one kind of lamp using dielectric barrier discharge. Here, the dielectric barrier discharge represents discharge generated between two electrodes separated by an insulating dielectric material, and the excimer lamp emits and irradiates light through this discharge.

Among the excimer lamps, a typical external electrode type excimer has an advantage capable of having an inexpensive manufacturing cost due to a simple configuration and a high optical efficiency by using a plurality of light emitting tubes and including a flat type light source according to an arrangement method of the light emitting tubes.

FIG. 1A is a schematic plan view illustrating the typical external electrode type excimer lamp, FIG. 1B is a front cross-sectional view illustrating the excimer lamp of FIG. 1A, and FIG. 1C is a side cross-sectional view illustrating the excimer lamp of FIG. 1A.

Referring to FIGS. 1A to 1C, the typical external electrode type excimer lamp includes a light emitting tube 1 having an inner space S filled with a discharge gas and first and second electrodes 2 and 3 separated or electrically insulated below the light emitting tube 1 along a longitudinal direction of the light emitting tube 1.

Here, a plurality of light emitting tubes 1 may be arranged to have a flat light source structure, and a plurality of first and second electrodes 2 and 3 may be alternately arranged along the longitudinal direction of the light emitting tube 1. Here, a discharge gas for forming excimer molecules by the dielectric barrier discharge is filled in the discharge space S, excimer discharge is generated as a high frequency and high voltage power is applied to the first and second electrodes 2 and 3, and light is emitted and irradiated to the outside of the light emitting tube 1 by the excimer discharge. Here, the emitted light is used for various purposes such as light cleaning, air purification, surface modification, skin treatment, and disinfection according to a wavelength thereof.

However, since the first and second electrodes 2 and 3 of the typical external electrode type excimer lamp are non-preheating type electrodes, the first and second electrodes 2 and 3 may not discharge initial electrons and inevitably use light, electrons, or radiation introduced from the outside as the initial electrons. Also, since the typical external electrode type excimer lamp is generally accommodated in the light irradiation device and shielded from the outside, start-up characteristics are poor under a low temperature environment or a dark environment. Thus, when lighting is delayed, e.g., a long time required until discharge initiation, a limitation such as lighting failure may occur.

In order to improve this limitation, an auxiliary light source such as a small-sized discharge lamp or LED may be provided at one side of the excimer lamp, and light is irradiated from the auxiliary light source to the excimer lamp. However, this case also has a limitation stated below.

Firstly, the typical external electrode type excimer lamp may include an auxiliary light source at a front side or a side thereof. However, when the auxiliary light source is installed on the light irradiation device, an additional design such as an additional structure for shielding exposure of light emitted from the auxiliary light source to the outside, a separate installation space for the auxiliary light source, and a circuit component for supplying a power to the auxiliary light source is required. Accordingly, a size of the light irradiation device is increased, and a manufacturing cost thereof is increased.

Also, the typical external electrode type excimer lamp may include the auxiliary light source at a lower side thereof. However, specks may be generated in light irradiated from the excimer lamp as a wavelength of light emitted from the auxiliary light source is mixed and interfered by a wavelength of light emitted from the excimer lamp, and a total thickness of the light irradiation device is increased due to the additional installation space for the auxiliary light source and the additional circuit component.

SUMMARY

Embodiments of the present invention provides a light irradiation device capable of improving start-up characteristics and a light irradiation efficiency by supplying energy having the same wavelength into a light emitting tube through an auxiliary light emitting body.

Embodiments of the present invention also provide a light irradiation device capable of being miniaturized and reducing a manufacturing cost because a separate space for installing an auxiliary light emitting body and a separate circuit component for power supply are not required.

Embodiments of the present invention also provide a light irradiation device capable of preventing an optical defect or a component damage due to an external factor such as an external vibration, a component load, and an assembly tolerance.

According to an embodiment of the present invention, a light irradiation device includes: an excimer lamp including a light emitting tube configured to emit light, a first electrode disposed at an outer side of the light emitting tube, a second electrode disposed at an outer side of the light emitting tube in correspondence to the first electrode, and an auxiliary light emitting body disposed between the first electrode and the second electrode to emit light toward the light emitting tube when a voltage is applied to the first and second electrodes; and a case in which the excimer is provided and which has a contact point adjustment part configured to accommodate a portion of the auxiliary light emitting body.

Here, the contact point adjustment part may have a groove shape in which a portion of the auxiliary light emitting body is inserted and seated and which is formed in an inner surface of the case.

Here, the contact point adjustment part may have a depth less than a half of a maximum distance between edges of the auxiliary light emitting body in a direction in which the auxiliary light emitting body is inserted.

Also, the first and second electrodes may have first and second electrode ends respectively protruding from mutually facing outer surfaces thereof, and the auxiliary light emitting body may be disposed adjacent to facing outer surfaces of the first and second electrode ends.

Here, the contact point adjustment part may have a width corresponding to a distance between the first and second electrode ends.

Also, the light emitting tube and the auxiliary light emitting body may emit light having the same wavelength range by dielectric barrier discharge generated when a voltage is applied to the first and second electrodes.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Hereinafter, preferred embodiments of the present invention will be described with reference to the accompanying drawings. Hereinafter, in the following description, specific details such as a method, a device, and/or a system are described to provide more general understandings of the present invention. However, this is merely an example, and the embodiments of the present invention are not limited thereto.

Moreover, detailed descriptions related to well-known functions or configurations will be ruled out in order not to unnecessarily obscure subject matters of the present invention. Also, terms used in this specification are terms defined in consideration of functions according to embodiments, and thus the terms may be changed according to the intension or usage of a user or operator. Therefore, the terms should be defined on the basis of the overall contents of this specification. It will be understood that although the terms are used herein to describe various embodiments of the present inventions and should the embodiments not be limited by these terms. The terms of a singular form may include plural forms unless referred to the contrary. The meaning of “include,” “comprise,” “including,” or “comprising,” specifies a property, a region, a fixed number, a step, a process, an element and/or a component but does not exclude other properties, regions, fixed numbers, steps, processes, elements and/or components.

Figure 1A:
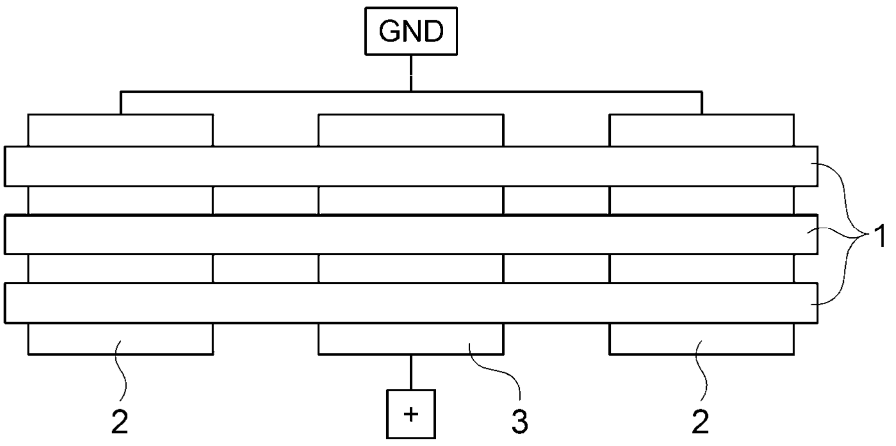
FIG. 1A is a schematic plan view illustrating a typical external electrode type excimer lamp.
Figure 1B:
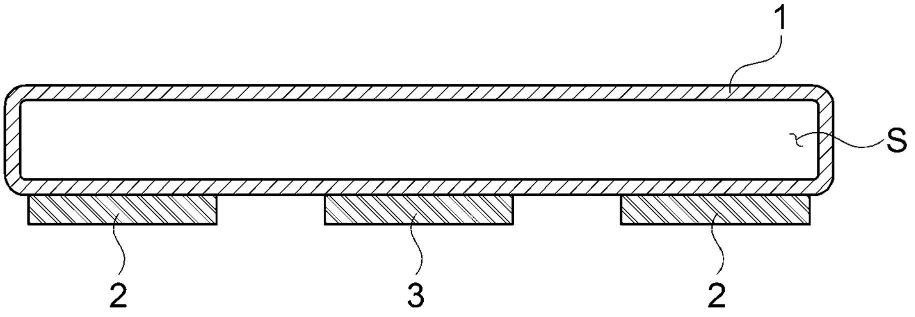
FIG. 1B is a front cross-sectional view illustrating the excimer lamp of FIG. 1A.
Figure 1C:
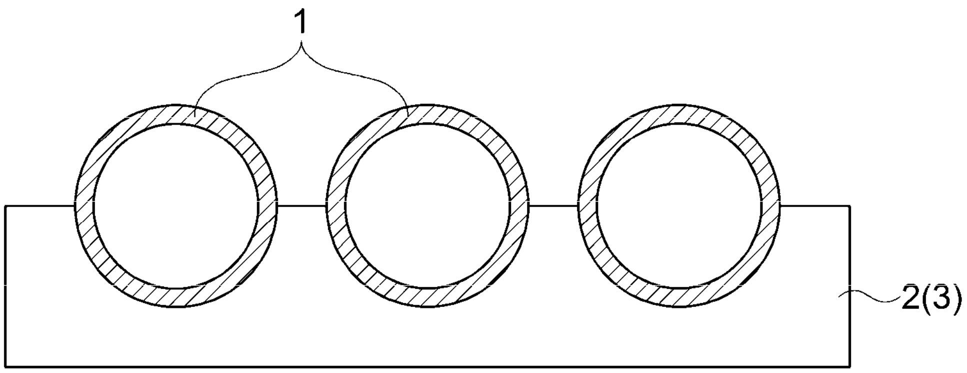
FIG. 1C is a side cross-sectional view illustrating the excimer lamp of FIG. 1A.
Figure 2A:
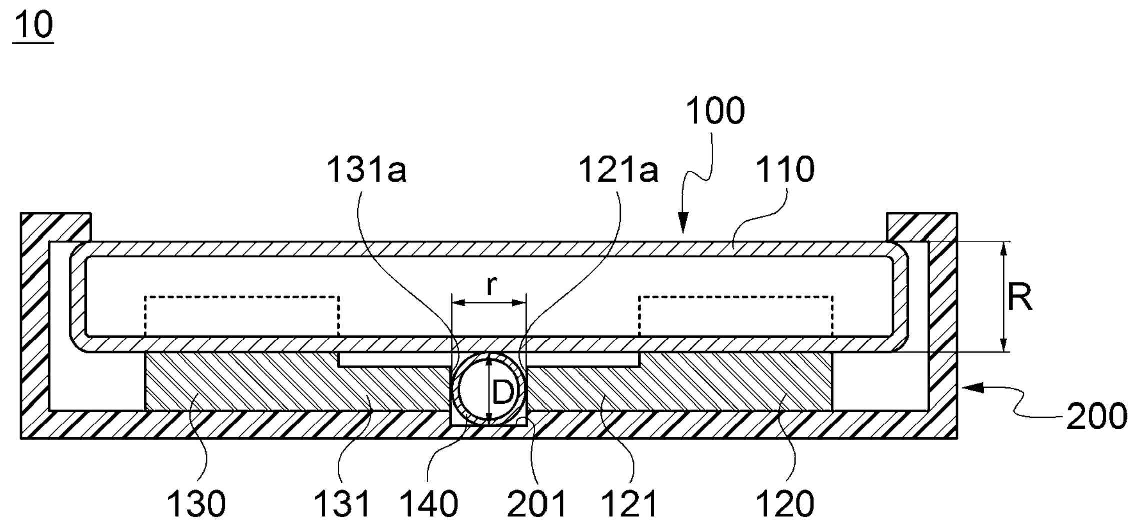
FIG. 2A is a schematic front cross-sectional view illustrating a light irradiating device according to an embodiment of the present invention.
Figure 2B:
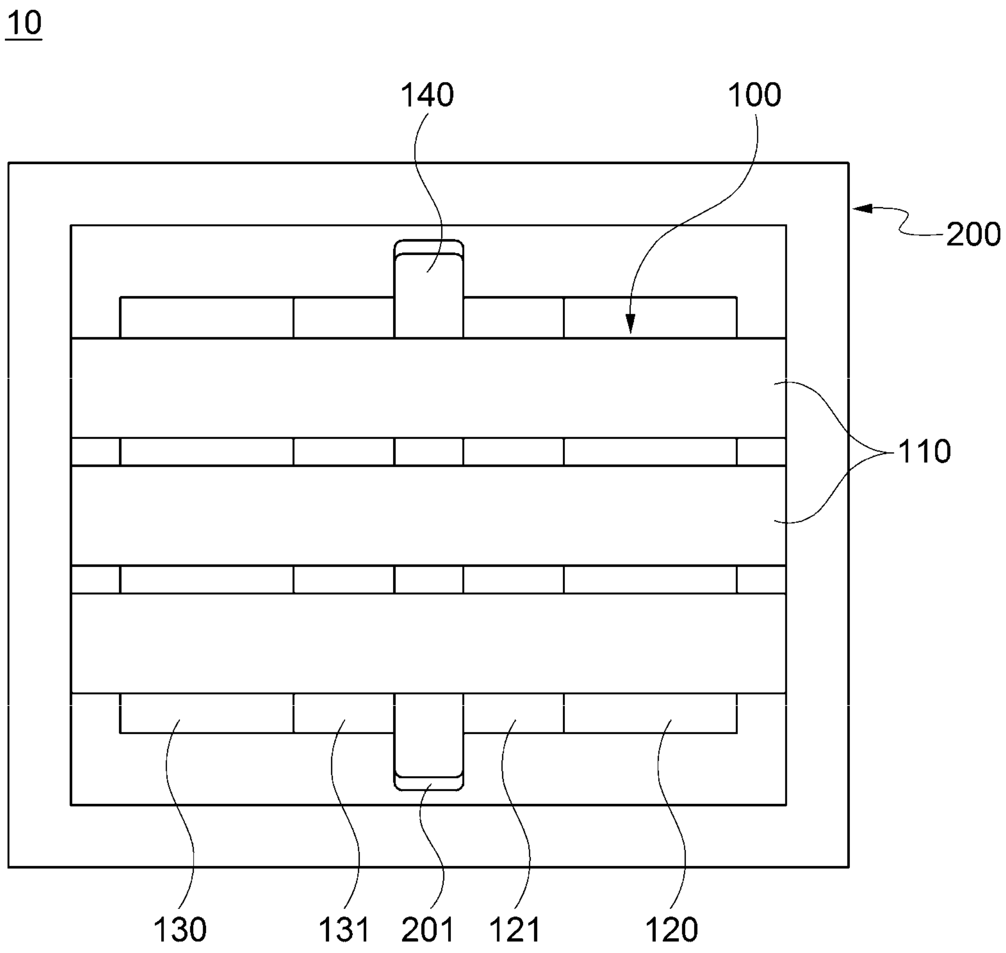
FIG. 2B is a plan view of FIG. 2A.
Figure 3A:
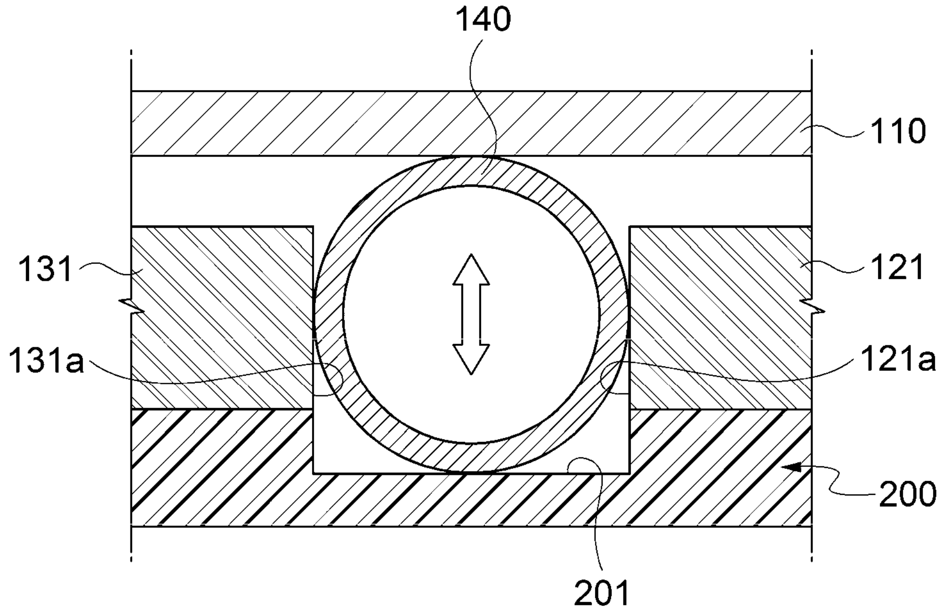
FIG. 3A is an enlarged view for explaining an action of a main portion of the light irradiating device according to an embodiment of the present invention.
Figure 3B:
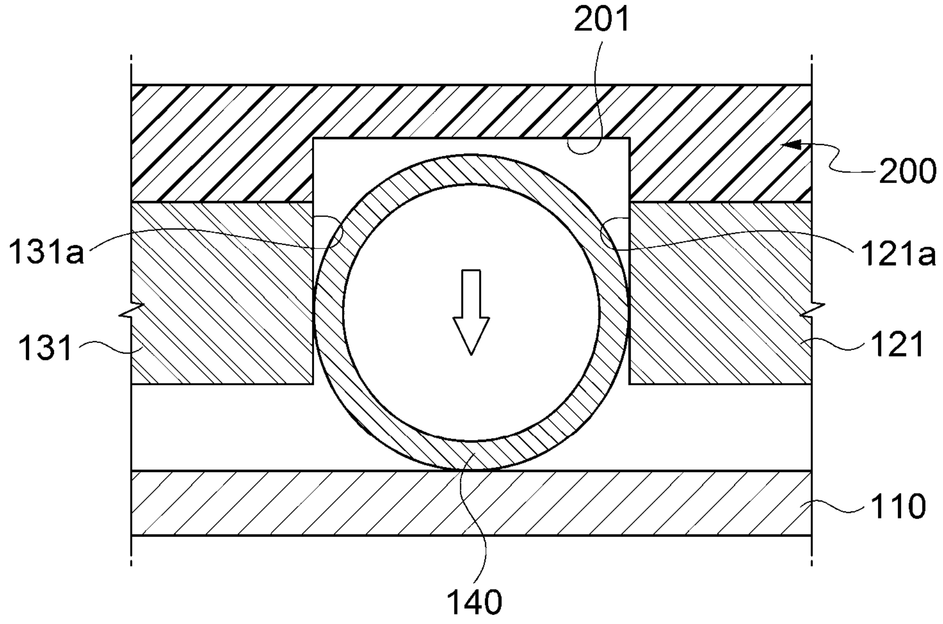
FIG. 3B is an enlarged view for explaining the action of the main portion in a state in which the light irradiating device according to an embodiment of the present invention is installed to irradiate light downward.
Figure 4A:
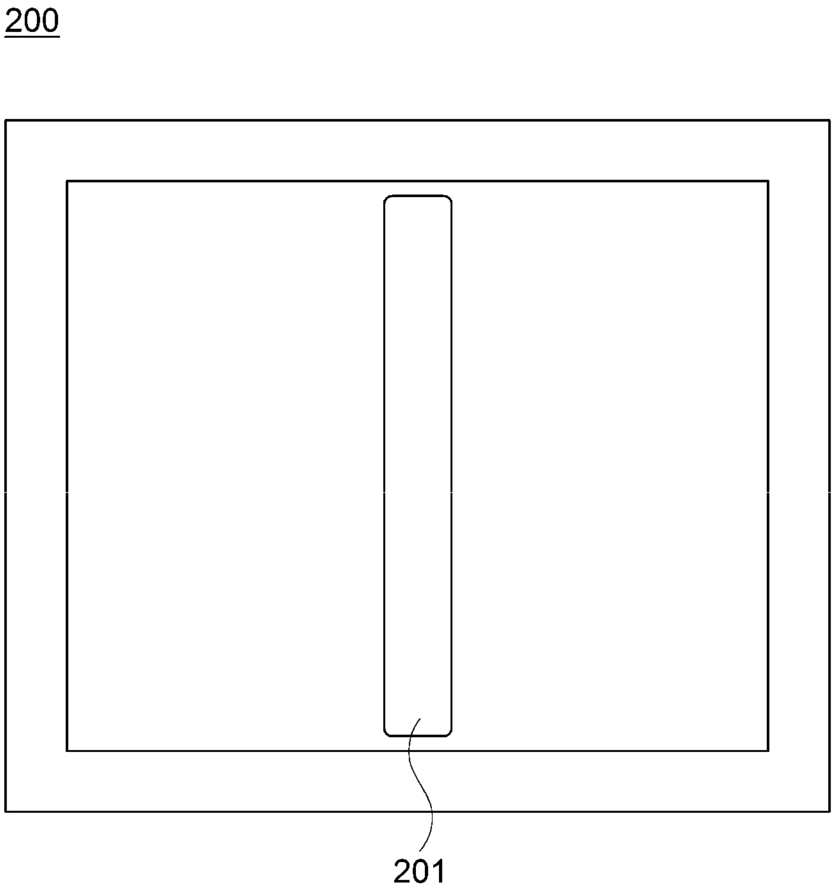
FIG. 4A is a schematic plan view illustrating a case of the light irradiating device according to an embodiment of the present invention.
Figure 4B:
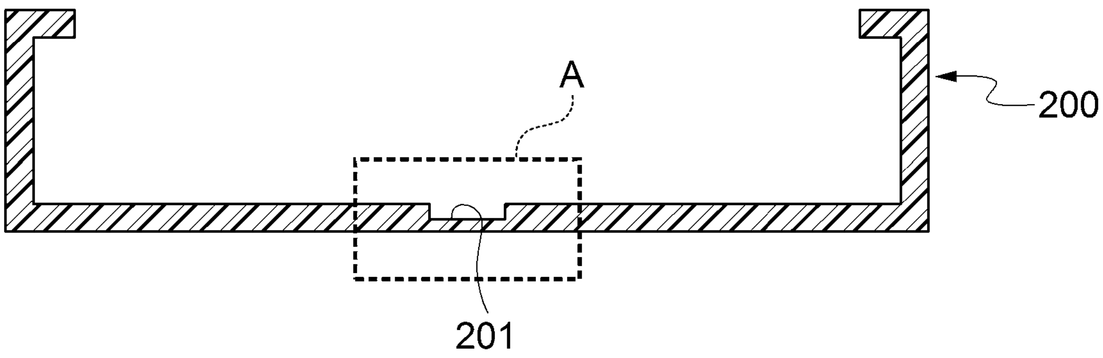
FIG. 4B is a front cross-sectional view of FIG. 4A.
Figure 4C:
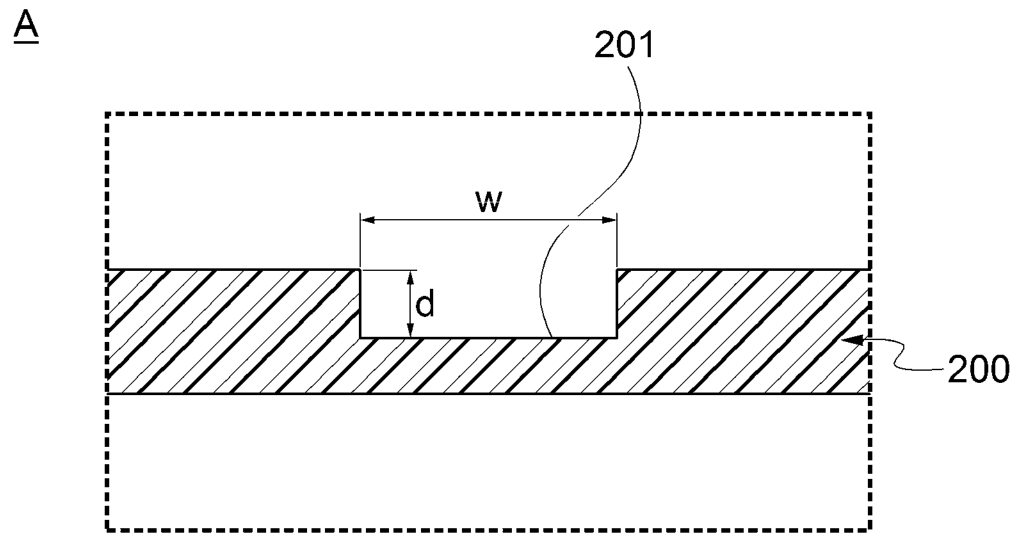
FIG. 4C is an enlarged view illustrating a portion ‘A’ of FIG. 4B.

FIG. 2A is a schematic front cross-sectional view illustrating a light irradiating device according to an embodiment of the present invention, and FIG. 2B is a plan view of FIG. 2A. FIG. 3A is an enlarged view for explaining an action of a main portion of the light irradiating device according to an embodiment of the present invention, and FIG. 3B is an enlarged view for explaining the action of the main portion in a state in which the light irradiating device according to an embodiment of the present invention is installed to irradiate light downward. FIG. 4A is a schematic plan view illustrating a case of the light irradiating device according to an embodiment of the present invention, FIG. 4B is a front cross-sectional view of FIG. 4A, and FIG. 4C is an enlarged view illustrating a portion ‘A’ of FIG. 4B.

Referring to FIGS. 2A and 2B, the light irradiation device 10 according to an embodiment of the present invention may include an excimer lamp 100 for emitting light by dielectric barrier discharge and a case 200 in which the excimer lamp 100 is disposed.

Here, the excimer lamp 100 may include: a light emitting tube 110 having an inner space S filled with a discharge gas and emitting light in case of dielectric barrier discharge; a first electrode 120 disposed at a lower right side of the light emitting tube 110; a second electrode 130 disposed at a lower left side of the light emitting tube 110 in correspondence to the first electrode 120; and an auxiliary light emitting body 140 disposed between the first and second electrodes 120 and 130 to emit light toward the light emitting tube 110 when a voltage is applied to the first and second electrodes 120 and 130.

Also, the first and second electrodes 120 and 130 may have first and second electrode ends 121 and 131 respectively protruding from mutually facing outer surfaces, and the auxiliary light emitting body 140 may be disposed adjacent to facing outer surfaces 121*a* and 131*a* of the first and second electrode ends 121 and 131.

Also, a contact point adjustment part 201 for accommodating a portion of a lower side of the auxiliary light emitting body 140 may be formed in the case 200, and the contact point adjustment part 201 may have a groove shape in which a portion of the lower side of the auxiliary light emitting body 140 is inserted and seated on an inner surface of the case 200.

Accordingly, as the contact point adjustment part 201 is formed in the case 200, the auxiliary light emitting body 140 may be prevented from being spaced apart from outer surfaces 121*a* and 131*a* of the first and second electrode ends 121 and 131 by external factors.

For example, as illustrated in FIG. 3A, when the light irradiation device 10 according to this embodiment is installed in home appliances such as air conditioners or air cleaners, as a vibration generated from the home appliances is transmitted to the light irradiation device 10, the auxiliary light emitting body 140 may be moved toward the light emitting tube 110 and spaced apart from the outer surfaces 121*a* and 131*a* of the first and second electrode ends 121 and 131.

As illustrated in FIG. 3B, when the light irradiation device 10 is installed in a downward irradiation method, the auxiliary light emitting body 140 may be moved toward the light emitting tube 110 due to own load of a component and an assembly tolerance of a component and spaced apart from the outer surfaces 121*a* and 131*a* of the first and second electrode ends 121 and 131.

Here, the light irradiation device 10 according to this embodiment may extend a contact point range of the auxiliary light emitting body 140 on the outer surfaces 121*a* and 131*a* of the first and second electrode ends 121 and 131 as many as an amount of the auxiliary light emitting body 140 inserted into the contact point adjustment part 201.

That is, although the auxiliary light emitting body 140 is moved toward the light emitting tube 110, a state in which the auxiliary light emitting body 140 is disposed adjacent to the outer surfaces 121*a* and 131*a* of the first and second electrode ends 121 and 131 may be maintained.

Thus, a component damage or an optical defect of the light irradiation device 10, which is generated as the auxiliary light emitting body 140 is spaced apart from a regular position may be prevented.

More specifically, referring to FIGS. 4A to 4C, a depth d of the contact point adjustment part 201 may be less than a half of a maximum distance D between edges of the auxiliary light emitting body 140 along a direction in which the auxiliary light emitting body 140 is inserted. That is, the contact point adjustment part 201 may satisfy an equation of 'D/2>d'.

Here, the contact point adjustment part 201 may have a width w corresponding to a distance between the outer surfaces 121*a* and 131*a* of the first and second electrode ends 121 and 131.

In this case, the state in which the auxiliary light emitting body 140 is disposed adjacent to the outer surfaces 121*a* and 131*a* of the first and second electrode ends 121 and 131 may be stably maintained although an external factor is generated. Also, increase in thickness of the case 200 may be minimized while maintaining optical characteristics of the light irradiation device 10 in an optimized state.

Although the auxiliary light emitting body 140 may have a tube shape having an axial direction crossing that of the light emitting tube 110, the embodiment of the present invention is not limited thereto. For example, the auxiliary light emitting body 140 may have a tube shape having a cross-sectional shape of a circle, an ellipse, and a polygon or a shape except for the circular, elliptical, or polygonal tube shape as long as the auxiliary light emitting body 140 is disposed adjacent to the facing outer surfaces 121*a* and 131*a* of the first and second electrode ends 121 and 131.

Also, the same discharge gas as that filled in the inner space of the light emitting tube 110 may be filled in the auxiliary light emitting body 140. Here, the discharge gas may be a xenon (Xe) gas that is an inert gas. However, the embodiment of the present invention is not limited thereto. For example, the discharge gas may be one of arbitrary excimers (KrCl, XeI, XeCl, Xe, etc.). Here, the auxiliary light emitting body 140 may be made of all sorts of materials through which light is transmitted by dielectric barrier discharge.

Thus, when a voltage is applied to different areas of the first and second electrodes 120 and 130, the auxiliary light emitting body 140 causes dielectric barrier discharge by an electric field generated between the first and second electrodes 121 and 131, and light emitted from the auxiliary light emitting body 140 through the dielectric barrier discharge is irradiated toward the light emitting tube 110 and supplies energy to the discharge gas existing in the inner space of the light emitting tube 110. Accordingly, as ionization of the discharge gas is accelerated, start-up characteristics of the light emitting tube 110 and the excimer lamp 100 having the same is increased, and a lighting property thereof is improved.

Here, the light emitted from the auxiliary light emitting body 140 may have the same wavelength range as light emitted from the light emitting tube 110, and a light irradiation performance and efficiency may be improved by increasing a quantity of light irradiated to the outside through the light emitting tube 110.

Also, as the light having the same wavelength range is emitted and irradiated from the auxiliary light emitting body 140 to the light emitting tube 110, an optical defect of the light irradiated to the outside through the light emitting tube 110 such as optical specks and smears may be prevented.

Also, the auxiliary light emitting body 140 is disposed in a space between the first and second electrodes 120 and 130 and emits light through the electric field of the first and second electrodes 121 and 131. Thus, a separate space, a separate device, and a circuit component for installing the auxiliary light emitting body 140 are unnecessary. Since a size of each of the excimer lamp 100 and the light irradiation device including the same is unnecessary to be increased for improving the start-up characteristics, the excimer lamp 100 and the light irradiation device having the same may be miniaturized, and a manufacturing cost thereof may be saved.

Referring to FIG. 2A, a distance between the outer surfaces 121*a* and 131*a* of the first and second electrode ends 121 and 131, to which the auxiliary light emitting body 140 is adjacent, may be less than the diameter R of the light emitting tube 110. That is, when the auxiliary light emitting body 140 has a tube shape, the auxiliary light emitting body 240 may have a diameter r less than the diameter R of the light emitting tube 110. Thus, the light irradiation device 10 according to this embodiment may improve the start-up characteristics and the light irradiation efficiency caused by the auxiliary light emitting body 140 without changing the size of the excimer lamp 100.

According to the embodiments of the present invention, the excimer lamp and the light irradiation device may have the improved start-up characteristics and light irradiation efficiency by supplying light having the same wavelength range as the light emitting tube into the light emitting tube through the auxiliary light emitting body and accelerating the ionization of the gas in the light emitting tube.

Also, according to the embodiments of the present invention, the excimer lamp and the light irradiation device having the same may be miniaturized and save the manufacturing cost by including the auxiliary light emitting body for the discharge of the light emitting tube between the first and second electrodes and omitting the additional installation space for the auxiliary light emitting body.

Also, according to the embodiments of the present invention, the separate space for the discharge of the auxiliary light emitting body and the circuit component may be omitted by simultaneously inducing the discharge of the auxiliary light emitting body when the voltage is applied to the first and second electrodes for the discharge of the light emitting tube. Thus, the light irradiation device may be miniaturized, and the manufacturing cost may be further saved.

In addition, according to the embodiments of the present invention, the component damage or the optical defect of the light irradiation device generated as the auxiliary light emitting body is spaced apart from the regular position by the assembly tolerance and own load of the component in the installation direction of the light irradiation device or the vibration generated from the home appliances when the light irradiation device is applied to the home appliances is transmitted may be prevented.

Although the embodiments of the present invention have been described, it is understood that the present invention should not be limited to these embodiments but various changes and modifications can be made by one ordinary skilled in the art within the spirit and scope of the present invention as hereinafter claimed. Therefore, the scope of this disclosure is defined not by the detailed description of the invention but by the appended claims, and all differences within the scope will be construed as being included in the present disclosure.

What is claimed is:

1. A light irradiation device comprising:

an excimer lamp comprising a light emitting tube configured to emit light, a first electrode disposed at an outer side of the light emitting tube, a second electrode disposed at an outer side of the light emitting tube in correspondence to the first electrode, and an auxiliary light emitting body disposed between the first electrode and the second electrode to emit light toward the light emitting tube when a voltage is applied to the first and second electrodes; and a case in which the excimer is provided and which has a contact point adjustment part configured to accommodate a portion of the auxiliary light emitting body.

2. The light irradiation device of claim 1, wherein the contact point adjustment part has a groove shape in which a portion of the auxiliary light emitting body is inserted and seated and which is formed in an inner surface of the case.

3. The light irradiation device of claim 2, wherein the contact point adjustment part has a depth less than a half of a maximum distance between edges of the auxiliary light emitting body in a direction in which the auxiliary light emitting body is inserted.

4. The light irradiation device of claim 1, wherein the first and second electrodes have first and second electrode ends respectively protruding from mutually facing outer surfaces thereof, and the auxiliary light emitting body is disposed adjacent to facing outer surfaces of the first and second electrode ends.

5. The light irradiation device of claim 2, wherein the first and second electrodes have first and second electrode ends respectively protruding from mutually facing outer surfaces thereof, and the auxiliary light emitting body is disposed adjacent to facing outer surfaces of the first and second electrode ends.

6. The light irradiation device of claim 3, wherein the first and second electrodes have first and second electrode ends respectively protruding from mutually facing outer surfaces thereof, and the auxiliary light emitting body is disposed adjacent to facing outer surfaces of the first and second electrode ends.

7. The light irradiation device of claim 4, wherein the contact point adjustment part has a width corresponding to a distance between the first and second electrode ends.

8. The light irradiation device of claim 1, wherein the light emitting tube and the auxiliary light emitting body emit light having the same wavelength range by dielectric barrier discharge generated when a voltage is applied to the first and second electrodes.

* * * * *